United States Patent
Nakano et al.

(10) Patent No.: US 6,894,413 B2
(45) Date of Patent: May 17, 2005

(54) PERMANENT MAGNET DYNAMO ELECTRIC MACHINE, AND PERMANENT MAGNET SYNCHRONOUS GENERATOR FOR WIND POWER GENERATION

(75) Inventors: Masatsugu Nakano, Tokyo (JP); Haruyuki Kometani, Tokyo (JP); Mitsuhiro Kawamura, Tokyo (JP); Yuji Ikeda, Tokyo (JP)

(73) Assignees: Mitsubishi Denki Kabushiki Kaisha, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 10/478,052

(22) PCT Filed: Dec. 19, 2002

(86) PCT No.: PCT/JP02/13309

§ 371 (c)(1),
(2), (4) Date: Nov. 18, 2003

(87) PCT Pub. No.: WO03/055045

PCT Pub. Date: Jul. 3, 2003

(65) Prior Publication Data

US 2004/0155537 A1 Aug. 12, 2004

(30) Foreign Application Priority Data

Dec. 20, 2001 (JP) ........................................ 2001-387442

(51) Int. Cl.$^7$ .............................................. H02K 21/12
(52) U.S. Cl. .................... 310/156.01; 310/261; 310/216
(58) Field of Search ....................... 310/156.01–156.81, 310/216, 261

(56) References Cited

U.S. PATENT DOCUMENTS

| | | | |
|---|---|---|---|
| 6,426,579 B1 * | 7/2002 | Oda et al. .................... | 310/261 |
| 6,566,778 B1 * | 5/2003 | Hasegawa et al. .......... | 310/211 |
| 6,657,348 B2 * | 12/2003 | Qin et al. .............. | 310/156.28 |

FOREIGN PATENT DOCUMENTS

| | | |
|---|---|---|
| JP | 10-210689 | 8/1998 |
| JP | 2000-060096 | 2/2000 |
| JP | 2000-125493 | 4/2000 |
| JP | 2001-054271 | 2/2001 |

* cited by examiner

Primary Examiner—Thanh Lam
(74) Attorney, Agent, or Firm—Leydig, Voit & Mayer, Ltd.

(57) ABSTRACT

A dynamo electric machine includes a rotor having magnetic poles with permanent magnets and a stator having armature windings concentratedly wound around teeth. When the number of pole pairs of the magnetic poles of the rotor is P, diameter of the rotor is D (meters), and a spatial harmonic order of a predetermined harmonic component of an armature magnetomotive force of the rotor is N ((N=P to the $1.5^{th}$ power)×(N to the minus 4-th power)×(the square of P)×D<0.6 (in meters).

16 Claims, 11 Drawing Sheets

| NUMBER P OF POLE PAIRS | NUMBER OF SLOTS | ORDER N | ROTOR OUTER DIAMETER D[m] | X[m] | RATE OF EDDY CURRENT LOSS [%] |
|---|---|---|---|---|---|
| 48 | 144 | 96 | 4.0 | 0.19 | 1.16 |
| 32 | 48 | 16 | 3.0 | 15.59 | 12.63 |
| 30 | 54 | 24 | 3.0 | 3.23 | 6.50 |
| 32 | 72 | 40 | 3.0 | 0.73 | 3.60 |
| 30 | 72 | 42 | 3.0 | 0.53 | 1.95 |
| 32 | 96 | 64 | 3.0 | 0.17 | 0.60 |

PERMANENT MAGNET DYNAMO ELECTRIC MACHINE, AND PERMANENT MAGNET SYNCHRONOUS GENERATOR FOR WIND POWER GENERATION

TECHNICAL FIELD

The present invention relates to a permanent magnet dynamo electric machine, and a permanent magnet synchronous generator for wind power generation, and more particularly, to a permanent magnet dynamo electric machine, and a permanent magnet synchronous generator for wind power generation, each including a rotor having a plurality of magnetic poles including permanent magnets, and a stator having armature windings around the magnetic poles.

BACKGROUND ART

Heretofore, a so-called permanent magnet type dynamo electric machine with concentrated winding including a rotor having a plurality of magnetic poles composed of permanent magnets, and a stator having armature windings concentratedly wound around the magnetic poles has been used in various applications. The concentrated winding has the construction in which the armature windings are concentratedly wound around the magnetic poles of the stator and hence automatic winding by a machine is possible therefor. Thus, many permanent magnet type dynamo electric machines with concentrated winding are used mainly for small motors such as servo. In such a small motor, a copper loss, a core loss, and a mechanical loss occupy a majority of the losses, and therefore an eddy current loss caused in the rotor does not become a problem in most cases.

On the other hand, in a large generator whose power generation exceeds several kilowatts, distributed winding was used in many cases in the past. However, the need for the concentrated winding having a small coil end is increasing even in a large generator. For example, in the case where a permanent magnet type synchronous generator is adopted in a wind power generation system, in particular, a gearless type wind power generation system, it can be said that the selection of the concentrated winding is better from a viewpoint that as compared with the distributed winding, in the concentrated winding, a small coil end allows an axial length to be reduced, and moreover, a less copper loss caused in armature windings enables to realize a high efficiency promotion.

As described above, the concentrated winding has a superior advantage in that the coil end is small, and moreover, the automatic winding is possible. However, it has a problem in that an eddy current loss of a rotor due to a magnetomotive force of an armature current becomes larger than that in the distributed winding. Moreover, in recent years, high performance magnets such as a rare earth magnet, each having a high residual magnetic flux density and a high coercive force, have been positively utilized as magnetic poles of a rotor of a large capacity generator. For example, an Nd—Fe—B-based magnet has such characteristics as being high in its electric conductivity, thereby allowing an eddy to easily flow as compared with a ferrite-based magnet.

From the above-mentioned reasons, in the large capacity generator with the concentrated winding, in particular, in the permanent magnet type dynamo electric machine, and the permanent magnet type synchronous generator for wind power generation, each having a rotor with a diameter larger than 1 m, the eddy current loss caused in the rotor reaches a significant level in some cases. Hence, such problems arose that the efficiency of the rotor was remarkably reduced due to the eddy current loss and that a temperature of the rotor rose due to the eddy current loss, incurring the demagnetization of the magnet. In addition, even if the demagnetization was not incurred, the residual magnetic flux density was reduced due to the temperature rise, with the result that the magnetic flux generated by the magnets was reduced. For this reason, more armature current needs to be caused to flow in order to generate the same output power as that in a state free from the temperature rise, and hence there was also a problem in that a copper loss is increased and the efficiency is reduced.

As a method for solving such problems, conventionally, there is a method in which a yoke of the rotor is constructed by a laminated steel plate to thereby reduce the eddy current. In addition, in JP 2001-54271 A, there is disclosed a method in which an iron core of a rotor is constructed by a massive yoke instead of a laminated steel plate, and the yoke is partitioned so that a path of the eddy current is cut off, to thereby reduce the eddy current.

However, there is a problem in that if the lamination structure is adopted for a yoke of a rotor, the cost becomes higher than in the case where an iron core is made of a massive yoke. Moreover, if a massive yoke is partitioned as disclosed in JP 2001-54271 A above, there arise various problems as will be described below. For example, due to an increase in the processing cost, the cost becomes higher as compared with an integral one-piece massive yoke. In addition, in the case where fluctuation occurs in thicknesses of insulating portions provided to the yoke of a rotor, fluctuation also occurs in the flux densities in gap portions of a motor. Thus, there is a fear in that this leads to ununiformity of the electromagnetic force which causes noises and vibration. In addition, there is a problem in that insulating portions for electrically insulating and dividing the yoke are provided in order to partition the yoke, and hence the magnetomotive force is consumed therein, which leads to reduction of the output power of the dynamo electric machine.

As described above, in the conventional permanent magnet type dynamo electric machine, the conventional permanent magnet type synchronous generator for wind power generation, and the like, in order to reduce the eddy current, the construction in which a lamination structure is adopted for a yoke of a rotor and the construction in which a massive yoke is partitioned have been proposed. However, when the lamination structure is adopted, there is a problem in that the cost becomes higher due to the increase in the processing cost. On the other hand, when a massive yoke is partitioned, there arises a problem in that fluctuation occurs in the magnetic flux densities of gap portions of a motor, which leads to ununiformity of the electromagnetic force. Consequently, it can be said that the yoke of the rotor is desirably of an integral type.

The present invention has been made in order to solve the above-mentioned problems associated with the prior art, and it is, therefore, an object of the present invention to obtain a permanent magnet type dynamo electric machine, and a permanent magnet type synchronous generator for wind power generation, each being capable of reducing an eddy current loss of a rotor, while keeping a construction of an integral type for a rotor yoke.

DISCLOSURE OF THE INVENTION

The present invention relates to a permanent magnet type dynamo electric machine and to a permanent magnet type synchronous generator for wind power generation, each of which includes a rotor having a plurality of magnetic poles composed of permanent magnets, and a stator having armature windings concentratedly wound around teeth, in which when the number of pole pairs of the rotor is P, a diameter of the rotor is D[m], a spatial harmonic order of a predetermined harmonic component of an armature magnetomotive force of the rotor is N (a mechanical angle 360 degrees is decided as 1-st order), and an output of the permanent magnet type dynamo electric machine is $P_{out}$, and then the D is made equal to or larger than $0.00045P_{out}+1.2$, a parameter X (its unit is m) used to evaluate the rate of an eddy current loss caused in the rotor is defined as follows;

$$X=(N+P)^{1.5}N^{-4}P^2D$$

and values of the P, D and N are selected so that a value of the X becomes smaller than a predetermined value.

Further, the present invention relates to a permanent magnet dynamo electric machine and to a permanent magnet synchronous generator for wind power generation, each of which includes a rotor having a plurality of magnetic poles including permanent magnets, and a stator having armature windings concentratedly wound around teeth, in which when the number of pole pairs of the rotor is P, diameter of the rotor is D [m], a spatial harmonic order of a predetermined harmonic component of an armature magnetomotive force of the stator is N (a mechanical angle 360 degrees is decided as 1-st order), and an output of the permanent magnet type dynamo electric machine is $P_{out}$, the D is made equal to or larger than $0.00045P_{out}+1.2$, and the P, D and N meet the following relationship:

$$(N+P)^{1.5}N^{-4}P^2D<0.6$$

(its unit is m).

Further, when the number of slots of the stator is S, the P and the S meet a relationship of 2P<S.

Further, when the number of slots of the stator is S, the P and the S meet a relationship of 2P:S=2:3, and also the P and the D meet the following relationship:

$$P^{-0.5}D<1.85$$

(its unit is m).

Further, when the number of slots of the stator is S, the P and the S meet a relationship of 2P:S=8:9, and also the P and the D meet the following relationship:

$$P^{-0.5}D<0.43$$

(its unit is m).

Further, when the number of slots of the stator is S, the P and the S meet a relationship of 2P:S=10:12, and also the P and the D meet the following relationship:

$$P^{-0.5}D<0.62$$

(its unit is m).

Further, the permanent magnet constituting the magnetic poles of the rotor is axially divided to provide a partition construction.

BEST MODE FOR CARRYING OUT THE INVENTION

Embodiment 1

Figure 1:
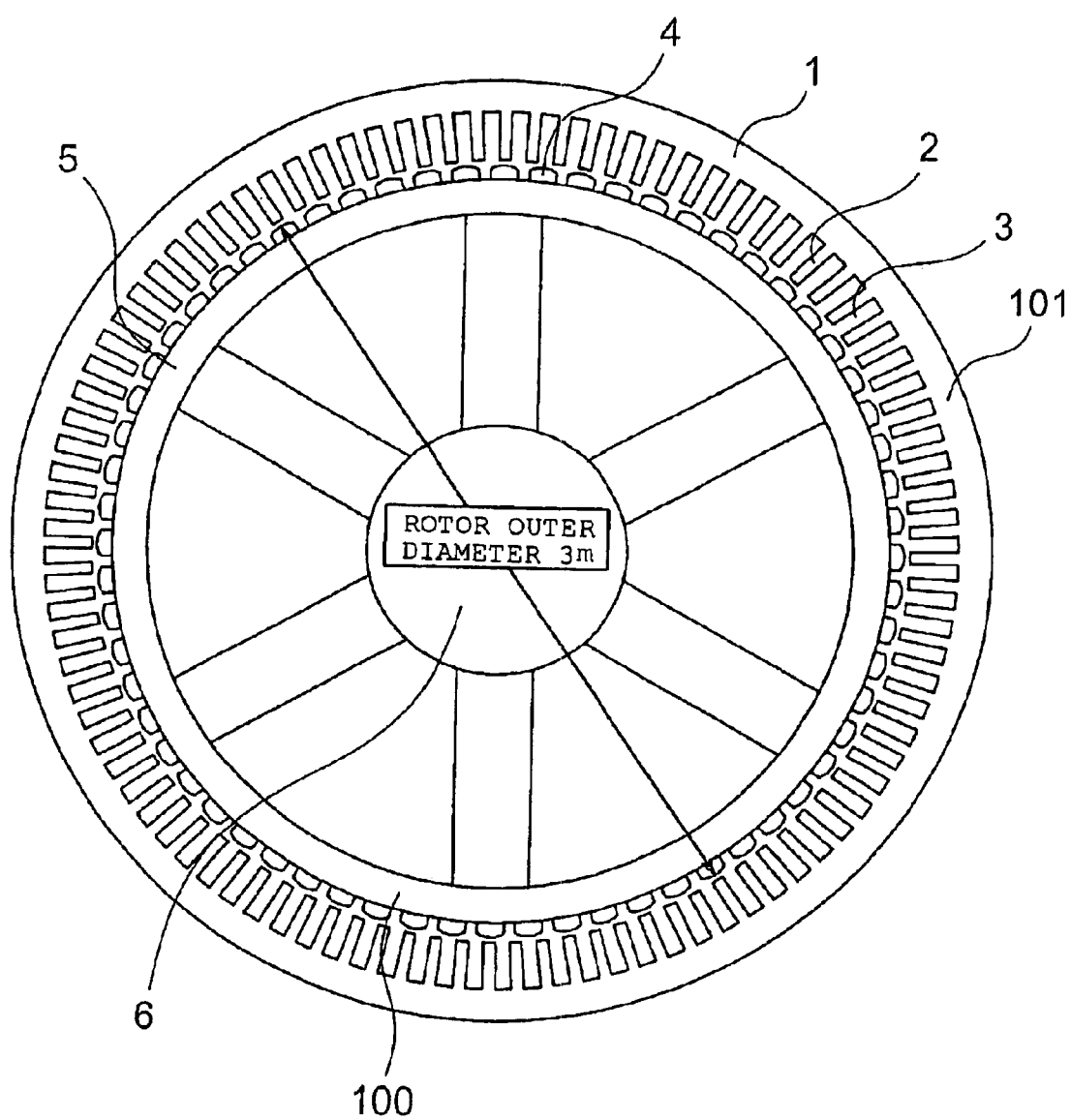
FIG. 1 is a cross sectional view showing a construction of a permanent magnet type synchronous generator according to an embodiment mode 1 of the present invention.

An example of an embodiment mode 1 of the present invention is shown in FIG. 1. FIG. 1 is a permanent magnet type synchronous generator of an inner rotor type. That is, in FIG. 1, a stator 101 is positioned outside a rotor 100. In FIG. 1, reference numeral 1 designates a stator iron core constituting the stator 101, reference numeral 2 designates a plurality of teeth provided in the stator iron core 1, reference numeral 3 designates a slot as a recess portion which is formed between the adjacent teeth 2, reference numeral 4 designates a plurality of permanent magnets provided in the rotor 100, reference numeral 5 designates an integral type massive rotor yoke to which the permanent magnets 4 are attached at equal intervals, and reference numeral 6 designates a rotation axis of the rotor 100.

As shown in FIG. 1, a rotor outer diameter is 3 m, the number of permanent magnets 4 provided in the rotor 100 (i.e., the number of rotor magnetic poles) is 64, and each of the number of teeth 2 of the stator 101 and the number of slots 3 of the stator 101 is 96. A surface magnet type synchronous generator is shown, in which the permanent magnets 4 are arranged on the surface of the massive yoke 5 of the rotor 100, and the stator 101 has the 96 teeth 2. While the illustration is omitted in FIG. 1, a winding system of a so-called concentrated winding is adopted, in which armature wirings are concentratedly wound around the teeth 2.

Figure 2A:
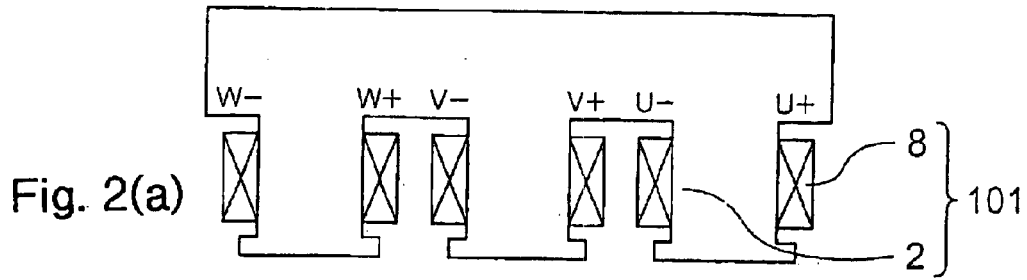
FIGS. 2(a)–2(d) show a winding arrangement and armature magnetomotive force in a permanent magnet type synchronous generator according to the embodiment mode 1 of the present invention.
Figure 2B:
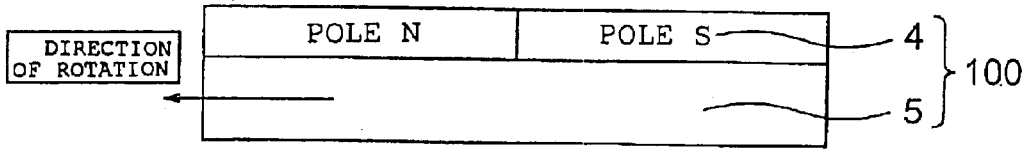

FIG. 2 (a) schematically shows a part of the stator 101 and the rotor 100 of FIG. 1, and FIGS. 2(b), 2(c) and 2(d) show magnetomotive force waveforms, each of which is formed by an armature current. In FIG. 2(a) reference numeral 8 designates the armature windings wound around the teeth 2. Since other constructions correspond to those shown in FIG. 1, the same constituent elements are designated with the same reference numerals, and the descriptions thereof are omitted here. Since in this embodiment mode, the ratio of the number of poles of the rotor 100 to the number of slots of the stator 101 is 2:3, the 2 poles and 3 slots electromagnetically become one unit. Thus, consideration with respect to the 2 poles and 3 slots may only be made. In the stator 101, as shown in FIG. 2(a), the armature wirings 8 of a phase U, a phase V and a phase W, i.e., 3 phases in total, are accommodated in the slots 3, and these armature windings 8 are concentratedly wound around the teeth 2. Sine-wave like currents whose electrical angles are shifted by 120 degrees with respect to one another, are caused to flow through the armature windings 8, having three phases, respectively. At the time when the currents have been caused to flow through the armature windings 8 respectively, in such a manner, a magnetomotive force having a rectangular waveform is generated in each gap portion. For example, when a current of 1 is caused to flow through the armature winding of the phase U, currents of −1/2 are caused to flow through the armature windings of the phase V and the phase W, respectively. At this time, the waveform of the magnetomotive force generated in each gap portion is as shown in FIG. 2(b). Actually, since the currents of the three phases are changed with time in accordance with a sine wave shape, the waveform of this magnetomotive force is also changed. If the waveform of the magnetomotive force is developed in the form of Fourier series with respect to time and space, it is understood that there are magnetomotive force components synchronous with the rotor 100, and asynchronous components.

Figure 2C:
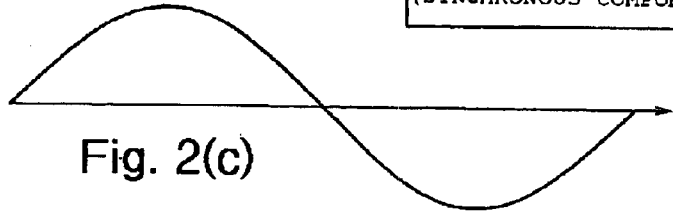
Figure 2D:
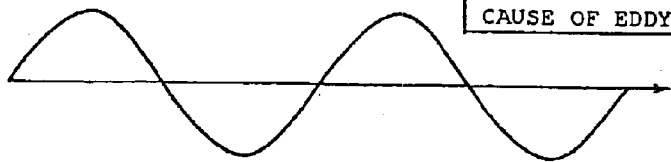
Figure 3:
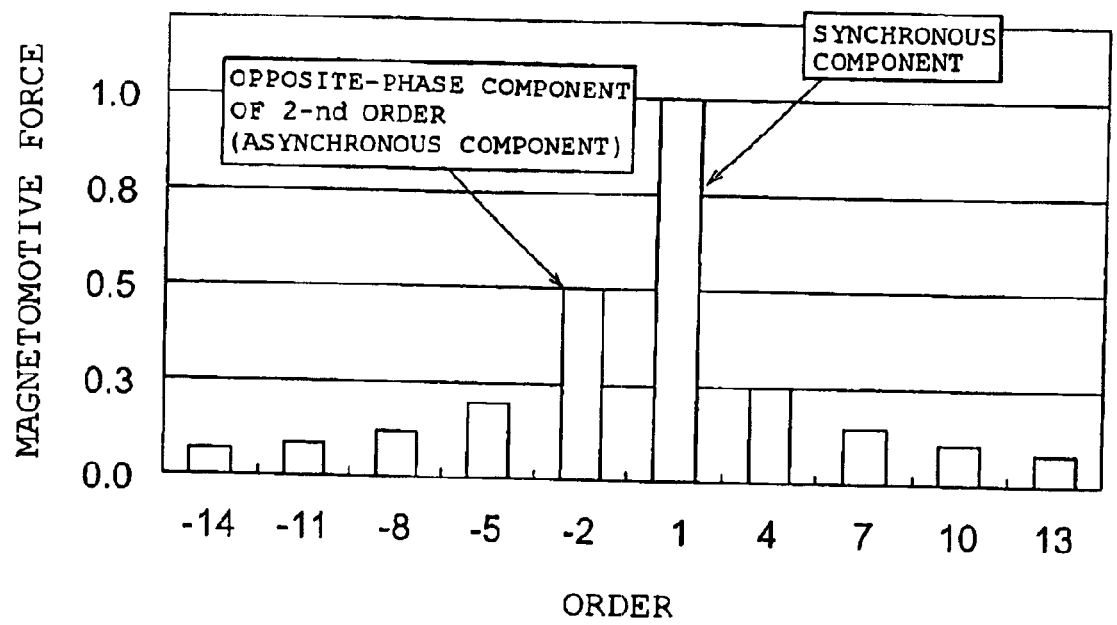
FIG. 3 is a graph showing the results of the Fourier analysis of a magnetomotive force waveform (when the number of poles: the number of slots is 2:3) in the permanent magnet type synchronous generator according to the embodiment mode 1 of the present invention.

The results of developing the magnetomotive force in terms of the Fourier series are shown in FIG. 3. FIG. 3 shows the results of the Fourier analysis of the magnetomotive force of the stator when the ratio of the number 2P of poles to the number S of slots is 2:3. The axis of abscissa represents a spatial harmonic order with the 2 poles (its electrical angle is 360 degrees) as a fundamental wave. Then, when its sign is positive, the axis of abscissa represents a magnetomotive force which shows a positive-phase and which is rotated in the same direction as that of the rotor 100. On the other hand, when its sign is negative, the axis of abscissa represents a magnetomotive force which shows an opposite phase and which is rotated in a direction opposite to the rotational direction of the rotor 100. The axis of ordinate represents amplitude of a magnetomotive force of a component concerned. Then, the normalization is carried out with magnitude of a component synchronous with the rotor, i.e., +1-st order as 1. However, all the harmonic components are not shown, and hence the components of equal to or higher than 15-th orders are omitted. Of the components of the magnetomotive force, the component synchronous with the magnetic poles of the rotor 100 is the component of +1-th order on the axis of abscissa, and a torque is obtained by this component. In addition, since this magnetomotive force component is the magnetomotive force which is not changed with time when viewed from the coordinate system fixed to the rotor 100, it does not become a cause of generation of an eddy current of the rotor 100. On the other hand, since the components other than that magnetomotive force component are the asynchronous components and hence are changed with time when viewed from the coordinate system fixed to the rotor 100, they become the cause of an eddy current of the rotor 100. In addition, of those asynchronous components, the component of −2-nd order has the largest amplitude. The synchronous component (the positive-phase component of a fundamental wave) and the opposite-phase component of 2-nd order as an example of the asynchronous component are shown in FIGS. 2(c) and 2(d), respectively. As has already been described, this synchronous component does not become the cause of an eddy current, while the asynchronous components cause an eddy current in the rotor 100. In particular, when the ratio of the number of poles to the number of slots is 2:3 as described above, since of the opposite-phase components, the opposite-phase component of 2-nd order has the largest amplitude, it may safely be said that the opposite-phase component of 2-nd order is the main cause of an eddy current loss caused in the rotor 100. Since the number of poles of the generator handled in this embodiment mode is 64, a spatial harmonic order of a waveform of the magnetomotive force becoming the main cause of the eddy current becomes 64-th order if a mechanical angle of 360 degrees are assumed to be 1-st order.

Next, for the purpose of grasping an eddy current of the rotor 100 generated by the presence of the above-mentioned asynchronous components, an eddy current will now be derived approximately using a simple model. Moreover, let us consider what relationship is established among the order N of the asynchronous component of the magnetomotive force to be the cause of the eddy current concerned, the number P of pole pairs of the rotor 100 and an outer diameter D[m] of the rotor 100, and in what manner the above-mentioned N and P should be selected in order to reduce the eddy current.

Figure 4:
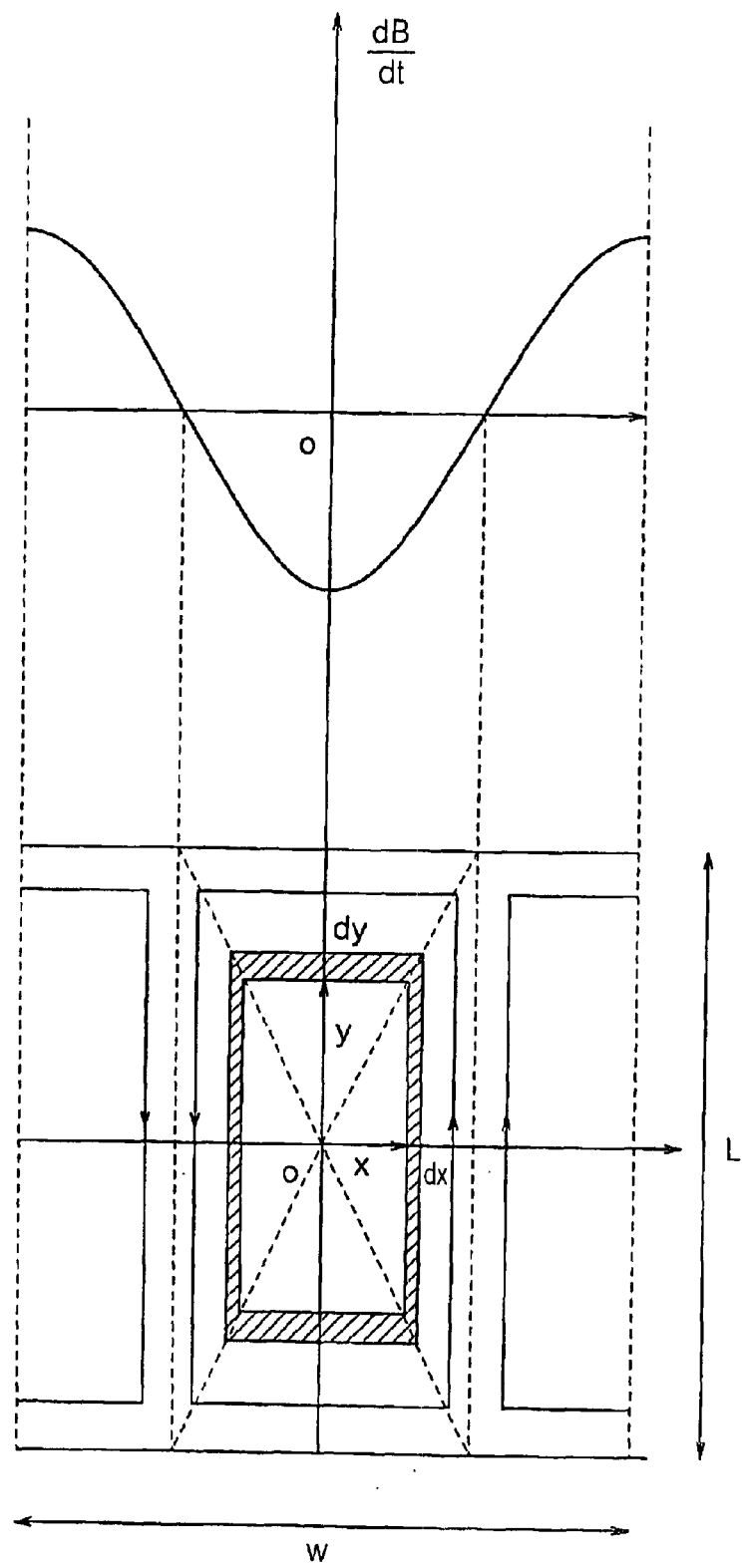
FIG. 4 shows a change of a magnetic flux with elapse of time and a path of an eddy current caused to flow through a rotor in the permanent magnet type synchronous generator according to the embodiment mode 1 of the present invention.

An upper stage of FIG. 4 shows a change with elapse of time of a magnetic flux generated with the asynchronous components of the magnetomotive force to be the cause of an eddy current. In addition, a lower stage of FIG. 4 shows a minute circuit (slant line portion) which is used when a path of an eddy current caused to flow through the rotor 100 due to a change of the magnet flux and an eddy current loss are obtained, and also shows a situation when the rotor 100 is overlooked from a gap surface in a simplified manner.

Note that, in FIG. 4, reference symbol w[m] designates a length for one period of a magnetomotive force to be the cause of an eddy current, i.e., a wavelength, and reference symbol L[m] designates a core length of the generator. In addition, reference symbol x designates a coordinate [m] representing a circumferential position, and reference symbol y designates a coordinate [m] representing an axial position. The path along which an eddy current is caused to flow, as shown in FIG. 4, is formed within a range of a width for a half wavelength of a magnetomotive force, i.e., a width of w/2. Then, a minute circuit is considered in the position, as exhibited by a slant line portion of the figure within the range of w/2, defined by the circumferential width 2x and the axial width 2y, and an eddy current loss is obtained from a resistance of this minute circuit and a magnetomotive force applied to this circuit to be further spatially integrated to thereby calculate the eddy current loss caused in the whole generator.

First of all, a resistance $r[\Omega]$ of the minute circuit is obtained. Since the resistance r is in proportion to resistivity $\rho$ [$\Omega$m] and a length of the circuit, and is inversely proportional to a cross section of the circuit, it is expressed as follows:

$$r = \rho\left(\frac{4y}{\delta dx} + \frac{4x}{\delta dy}\right). \quad (1)$$

However, here, $\delta$ is a skin depth of an eddy current and its unit is m. From FIG. 4, the following Expression is geometrically established:

$$y = \frac{L}{w}x, \, dy = \frac{L}{w}dx. \quad (2)$$

When Expression (2) is substituted for Expression (1), the following Expression is obtained:

$$r = \frac{4\rho}{\delta} \frac{L^2 + w^2}{wL} \frac{x}{dx}. \quad (3)$$

Next, an electromotive force applied to this minute circuit is obtained. A temporal and spatial change of the asynchronous component of the magnetic flux to be the cause of an eddy current is expressed as follows:

$$B(x, t) = B\sin\left(\frac{2\pi}{w}x - \omega t\right). \quad (4)$$

This Expression shows that a spatial frequency of a change of the magnetic flux density is $2\pi/w$, and a frequency thereof is $\omega$ [rad/sec]. Since the electromotive force applied to the minute circuit is expressed in the form of the time differential of a cross magnetic flux in an interval [-x, x], it is expressed as follows:

$$e = -\frac{d}{dt}\int_{-x}^{x} B(\xi, t)2y d\xi. \quad (5)$$

When Expression (4) is substituted for Expression (5), the following Expression (6) is obtained.

$$e = \frac{2\omega BL}{\pi}x\sin\left(\frac{2\pi}{w}x\right)\cos\omega t \quad (6)$$

Since the electromotive force is changed with time in the form of a sine wave, its effective value E is expressed as follows:

$$E = \frac{\sqrt{2}\,\omega BL}{\pi}x\sin\left(\frac{2\pi}{w}x\right). \quad (7)$$

If a reactance of the minute circuit is disregarded, then an eddy current loss dQ[W] generated in the minute circuit can be obtained as follows from Expressions (3) and (7):

$$dQ = \frac{E^2}{r} = \frac{\omega^2 B^2 \delta}{2\pi^2 \rho} \frac{wL^3}{L^2 + w^2} x\sin^2\left(\frac{2\pi}{w}x\right). \quad (8)$$

An eddy current loss of this minute circuit is integrated for an interval [-w/4, w/4]. Then, since the path along which the eddy current is caused to flow is formed by a width of a half wavelength of a magnetomotive force and hence the integrated value must be multiplied by 2N (=2πD/w), an eddy current loss Q[W] for the whole rotor is expressed as follows:

$$Q = 2N\int dQ \quad (9)$$
$$= \frac{2\pi D}{w} \int_0^{w/4} \frac{\omega^2 B^2 \delta}{2\pi^2 \rho} \frac{wL^3}{L^2 + w^2} x\sin^2\left(\frac{2\pi}{w}x\right) dx$$
$$= \left(\frac{1}{64\pi} + \frac{1}{16\pi^3}\right)\frac{Dw^2 B^2 \delta}{\rho} \frac{L^3 w^2}{L^2 + w^2}.$$

Moreover, when resistivity, permeability and a frequency are $\rho$, $\mu$ and $\omega$, respectively, the skin depth $\delta$ is expressed as follows:

$$\delta = \sqrt{\frac{2\rho}{\omega\mu}}. \quad (10)$$

Here, since normally, a relationship of w<<L is established in a generator, the following approximate Expression can be obtained:

$$\frac{L^3 w^2}{L^2 + w^2} \approx Lw^2.$$

In addition, since a relationship of w=πD/N is established, the following approximate Expression (11) can be obtained from Expressions (9) and (10):

$$Q \approx K\omega^{1.5}N^{-2}B^2D^3L \quad (11).$$

However, K is expressed as follows:

$$K = \left(\frac{\pi}{64} + \frac{1}{16\pi^2}\right)\sqrt{\frac{2}{\mu\rho}}. \quad (12)$$

In addition, if a rotational frequency $\omega_m$ [rad/sec] of a generator is used, then an angular frequency $\omega$ [rad/sec] of the eddy current generated by the asynchronous magnetomotive force of a spatial harmonic order N is expressed as follows:

$$\omega = (N \pm P)\omega_m \tag{13}$$

However, the sign "+" in Expression (13) corresponds to the case where the magnetomotive force of the spatial harmonic order N is of an opposite phase, while the sign "−" corresponds to the case where the magnetomotive force of the spatial harmonic order N is of a positive-phase. That is, when viewed from the coordinate system fixed to the rotor, the frequency of the magnetomotive force advancing in an opposite direction with the rotor appears to be high, conversely the frequency of the magnetomotive force advancing in the same direction as that of the rotor appears to be low. Consequently, Q can be written as follows from Expressions (11) and (13):

$$Q = K\omega_m^{1.5}(N \pm P)^{1.5}N^{-2}B^2D^3L \tag{14}$$

Figure 5:
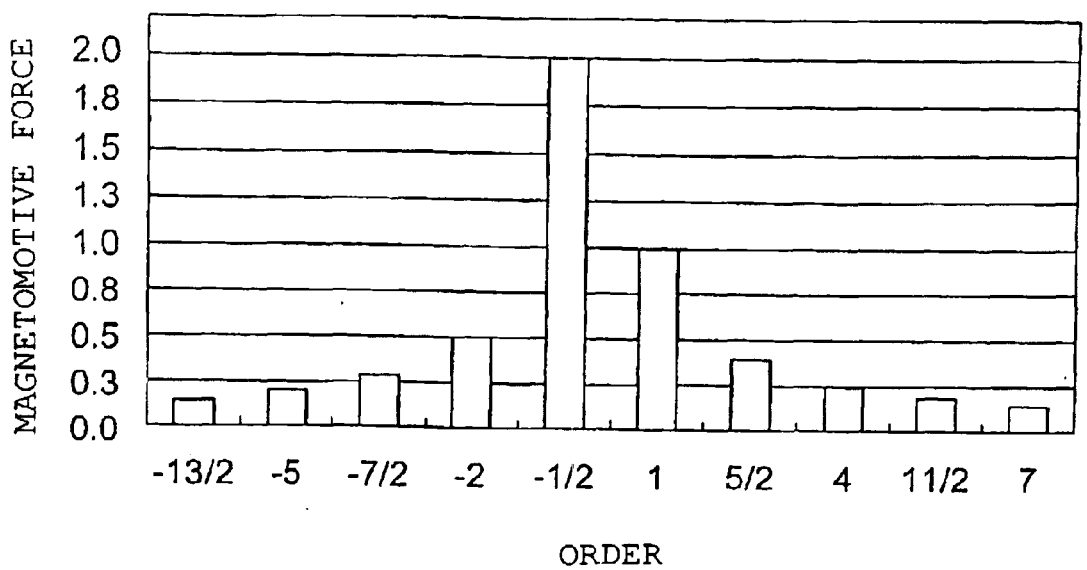
FIG. 5 is a graph showing the results of the Fourier analysis of a magnetomotive force waveform (when the number of poles: the number of slots is 4:3) in the permanent magnet type synchronous generator according to the embodiment mode 1 of the present invention.
Figure 6:
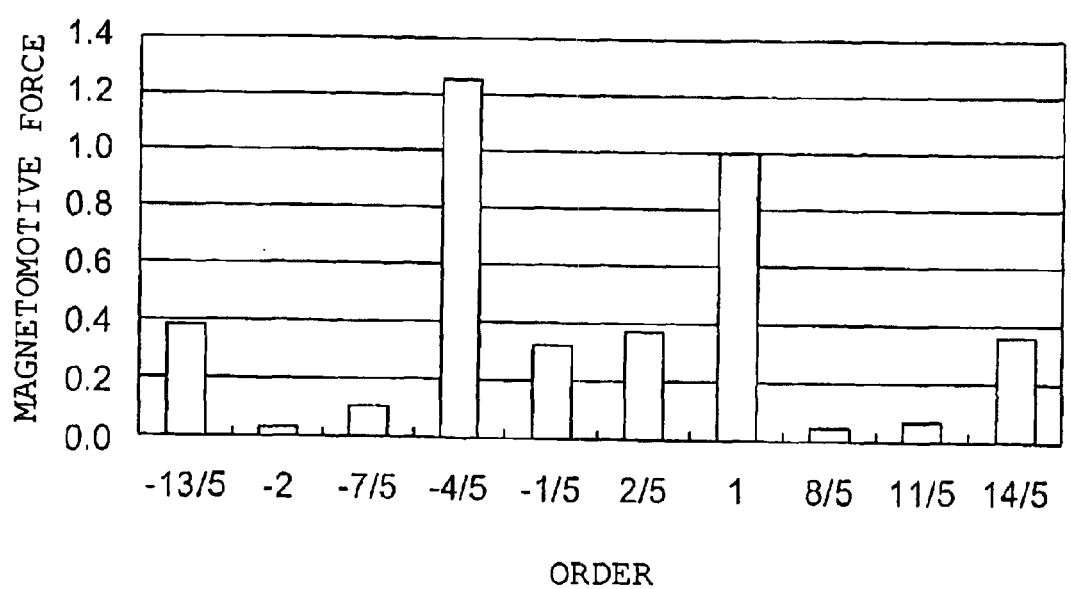
FIG. 6 is a graph showing the results of the Fourier analysis of a magnetomotive force waveform (when the number of poles: the number of slots is 10:9) in the permanent magnet type synchronous generator according to the embodiment model of the present invention.
Figure 7:
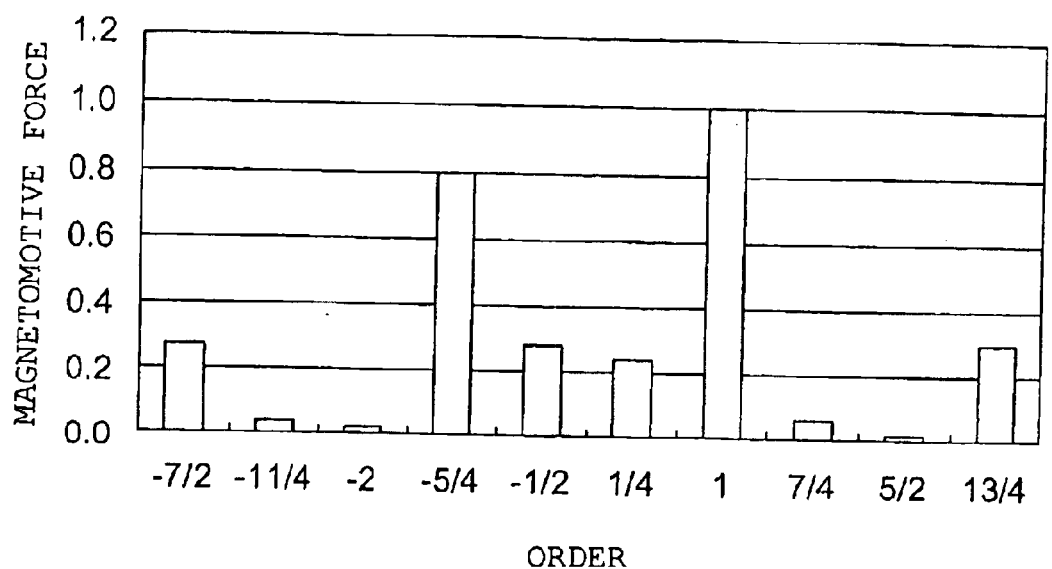
FIG. 7 is a graph showing the results of the Fourier analysis of a magnetomotive force waveform (when the number of poles: the number of slots is 8:9) in the permanent magnet type synchronous generator according to the embodiment mode 1 of the present invention.
Figure 8:
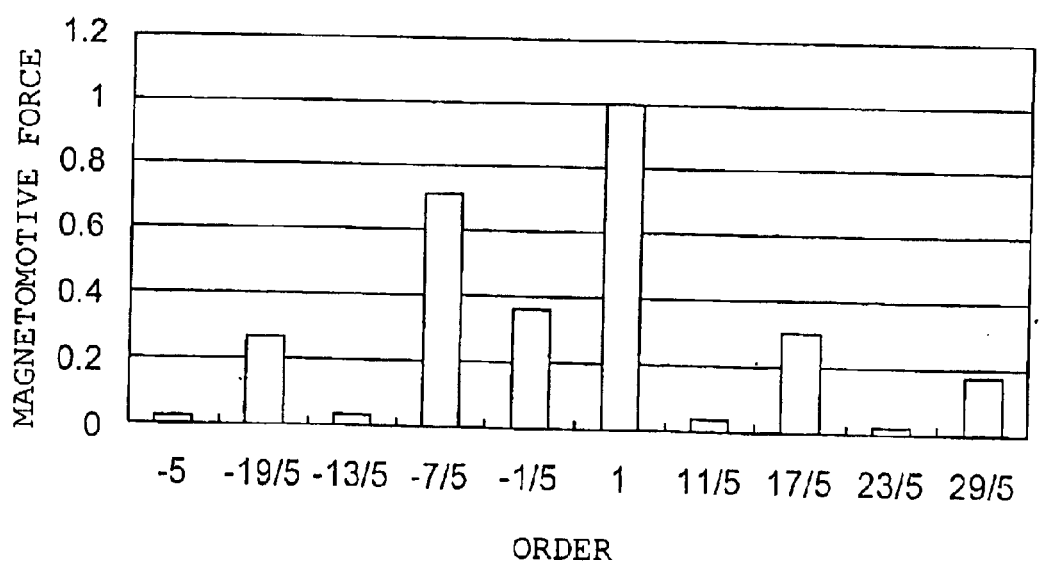
FIG. 8 is a graph showing the results of the Fourier analysis of a magnetomotive force waveform (when the number of poles: the number of slots is 10:12) in the permanent magnet type synchronous generator according to the embodiment mode 1 of the present invention.

What values the components of the magnetomotive force take against the various ratios of the numbers of poles to the numbers of slots which are usually used in the concentrated wiring are shown in FIGS. 5 to 8. FIG. 5 shows the results of the Fourier analysis of the magnetomotive force of the stator when the ratio of the number 2P of poles to the number S of slots is 4:3, FIG. 6 shows the results of the Fourier analysis of the magnetomotive force of the stator when the ratio of the number 2P of poles to the number S of slots is 10:9, FIG. 7 shows the results of the Fourier analysis of the magnetomotive force of the stator when the ratio of the number 2P of poles to the number S of slots is 8:9, and FIG. 8 shows the results of the Fourier analysis of the magnetomotive force of the stator when the ratio of the number 2P of poles to the number S of slots is 10:12.

In the case of the distributed winding, when 1 or 2 is obtained every pole and every phase, the asynchronous components of the magnetomotive force are of 5-th order in positive-phase, and of 7-th order or more in opposite phase. Thus, they are the components of higher order than that of the fundamental wave. However, in the case of the concentrated wiring, it is understood that even in the case of an asynchronous component having higher order than that of the fundamental wave, the order of the asynchronous component is near that of the fundamental wave as compared with the distributed wiring, and an asynchronous component is present even in a component having order lower than that of the fundamental wave in some cases. Furthermore, when spatial harmonic order of the magnetomotive force of the asynchronous component becoming the main cause of the eddy current is N (a mechanical angle 360 degrees is 1-st order), its magnitude is in proportion to the ratio of the number of pole pairs to the spatial harmonic order, i.e., P/N. Moreover, it is also found out from FIG. 3 and FIGS. 5 to 8 that of the magnetomotive force, i.e., the asynchronous components becoming the main cause of the eddy current loss, the asynchronous component having the largest amplitude is of an opposite phase. Accordingly, Expression (14) can be rewritten as follows:

$$Q = K_1\omega_m^{1.5}(N+P)^{1.5}N^{-4}P^2D^3L \tag{15}$$

where $K_1$ is a proportional constant. From the foregoing, an approximate Expression of the eddy current loss caused in the rotor could have been derived. This Expression shows that in a permanent magnet type generator or motor, the eddy current loss caused in the rotor greatly depends on the number P of pole pairs, the rotor outer diameter D, and the spatial harmonic order N of the opposite-phase magnetomotive force.

On the other hand, in general, it is known that the following relationship is approximately established among an outer diameter D, an axis length L and a rotational frequency $\omega_m$ of a rotor, and an output $P_{out}$.

$$P_{out} = K_2\omega_m D^2 L \tag{16}$$

where $K_2$ is a proportional constant. Accordingly, Expression (15) is divided by Expression (16) to thereby allow the rate of the eddy current loss to the output to be found.

$$\frac{Q}{P_{out}} = \frac{K_1}{K_2}\omega_m^{0.5}(N+P)^{1.5}N^{-4}P^2D \tag{17}$$

The factors depending on the construction of the generator, i.e., the number P of pole pairs, the spatial harmonic-order N of the higher harmonics of the magnetomotive force and the rotor outer diameter D are taken out from Expression (17), and then X (its unit is m) is defined as follows with these factors as parameters used to evaluate the rate of the eddy current loss caused in the rotor of the generator or motor.

$$X = (N+P)^{1.5}N^{-4}P^2D \tag{18}$$

While X, of course, does not show the rate in the strict sense of the word, it is considered that X is calculated in the various generators or motors to be aware of its magnitude to thereby become a criterion in accordance with which the magnitude of the eddy current loss is judged.

In the generator, such as a gearless type wind generator, requiring a large torque by rotating the rotor at a low speed, as apparent from Expression (16), increasing the diameter D is more advantageous than increasing the axis length L. In addition, considering with respect to the ratio of the axis length L to the diameter D, in the case where L is increased, a span of a bearing is increased, and it becomes necessary to supplement the rigidity, which leads to an increase in weight of the generator. Moreover, in the wind power generation, there are some cases a construction is adopted in which a bearing is provided only on one side of a generator. However, if L is increased, the mechanical rigidity is reduced, and it becomes impossible to realize this construction. Furthermore, if L is increased, the cooling therefor becomes impossible as long as a duct is not provided in viewpoint of the heat design. However, there is a problem in that if a duct is provided, L is further increased, and the weight is also increased. As a result of making an examination in the light of the foregoing, it has been found out that establishment of a relationship of $L \leq D$ is desirable, more preferably, a relationship of $L \leq 0.8D$ is established, and furthermore preferably, a relationship of $L \leq 0.5D$ is established.

Figure 16:
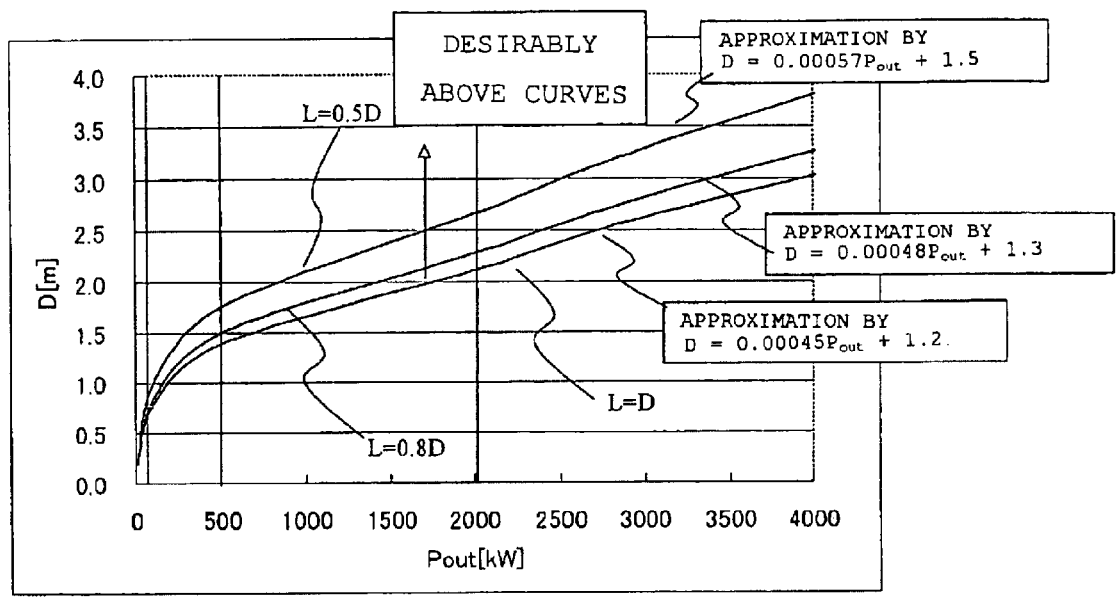
FIG. 16 is a graph showing a relationship between an output of a generator and a rotor outer diameter in the permanent magnet type synchronous generator according to the embodiment mode 1 of the present invention.

The case where for a relationship of an output $P_{out}$ of a generator v.s. D, L=D, L=0.8D and L=0.5D are respectively set is shown in FIG. 16. It is understood that as the output is increased, D needs to be increased. In addition, for the wind power generation, from a viewpoint of the mechanical rigidity and the heat design which have already been described, it is desirable that the design is made so as to meet an area above a curve in the case of L=D, it is more desirable that the design is made so as to meet an area above a curve in the case of L=0.8D, and it is furthermore desirable that the design is made so as to meet an area above a curve in the case of L=0.5D. Accordingly, it is understood from FIG. 16 that when the output is 2,000 kW, the design is preferably made so as to meet a relationship of $D \geq 2.2$ [m], more preferably so as to meet a relationship of $D \geq 2.3$ [m], and further more preferably so as to meet a relationship of $D \geq 2.7$ [m]. Moreover, it is understood that when the output is 500 kW, the design is preferably made so as to meet a relationship of D≧1.4 [m], more preferably so as to meet a relationship of D≧1.5 [m], and further more preferably so as to meet a relationship of D≧1.8 [m]. Also, it is understood that when the output is 100 kW, the design is preferably made so as to meet a relationship of D≧0.7 [m], more preferably so as to meet a relationship of D≧0.8 [m], and further more preferably so as to meet a relationship of D≧0.9 [m]. Then, if an area having an output equal to or larger than 500 kW is linearly approximated, D=0.00045$P_{out}$+1.2 when L=D, D=0.00048$P_{out}$+1.3 when L=0.8D, and D=0.00057$P_{out}$+1.5 when L=0.5D are respectively obtained (in these expressions, unit of $P_{out}$ is kW, and unit of D is m). Accordingly, it is desirable that the design is made so as to meet an area in which D is larger than that of these straight lines.

When the linear approximation is made, in the range in which the output is small, the approximation does not meet the actual curve. However, when the realization of the generators or motors with serial capacities is considered, the outer diameters are substantially made identical to one another and the axis lengths are adjusted because of limitations of production facility and the like in many cases. From this reason, even in an area in which the output is low, the linear approximation is adopted so as not for an outer diameter to be abruptly decreased. From the foregoing, since even when the output becomes low, an outer diameter is not extremely decreased, such an effect can be obtained that even in the case where the same production facility is adopted, it is possible to manufacture a generator having a low output.

In a gearless type generator for wind power generation, in the case of the generator having such a large capacity as to exceed 100 kW, such effects can be obtained that if a relationship between the rotor outer diameter D and the axis length L, or a value of D are designed so as to meet the above-mentioned conditions, a large torque is obtained to realize the design suitable for the gearless type, and in addition, since a compact construction is obtained, the cooling performance can be ensured even if no duct is provided, and so forth, and hence this becomes advantageous to the heat design as well. Also, such an effect can be obtained that since a span of the bearing is shortened, the mechanical rigidity can be ensured, and hence a construction also becomes possible in which the bearing is provided only on one side.

On the other hand, paying attention to X, when a dynamo electric machine having a large outer diameter, in particular, a wind power generator having such an outer diameter as to exceed 1 m is designed, it may safely be said that an eddy current caused to flow through a rotor cannot be ignored as long as P and N are not suitably selected.

Figures 9, 10:
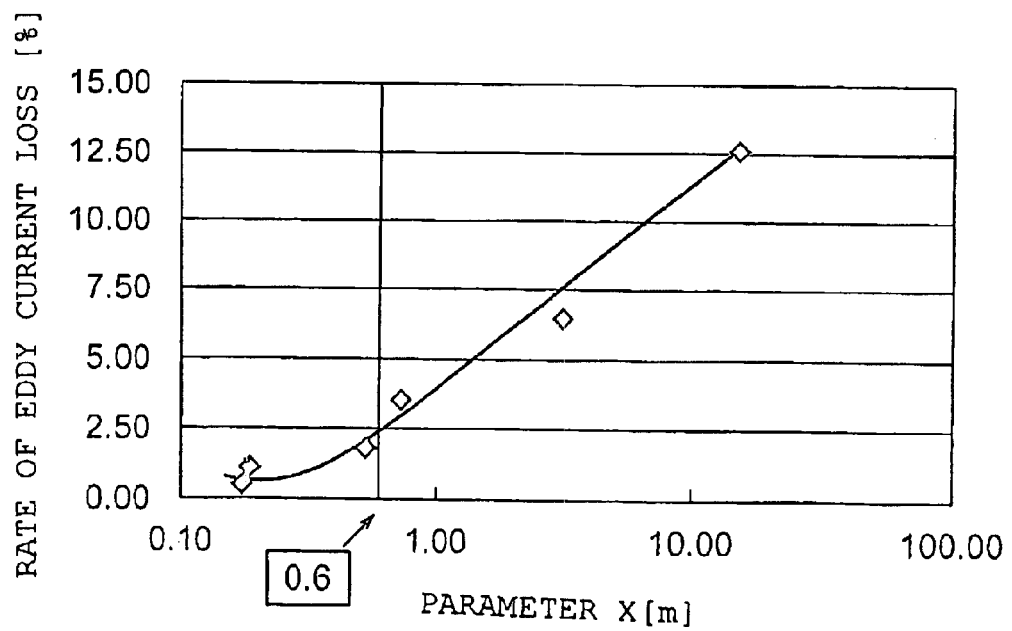
FIG. 9 shows an example of specifications of the permanent magnet type synchronous generator according to the embodiment mode 1 of the present invention.
FIG. 10 is a graph showing a change of the ratio of a parameter X to an eddy current loss in the permanent magnet type synchronous generator according to the embodiment model of the present invention.

For the purpose of verifying propriety of this parameter, six kinds of generators were designed in accordance with six kinds of specifications as shown in FIG. 9, and then eddy current losses generated in rotors during the rated running were obtained on the basis of the electromagnetic analysis. The results of analyzing the rate of the eddy current loss to the rated output in each of the specifications are shown in the most right-hand column of FIG. 9. Moreover, a graph in which X is plotted on the axis of abscissa, and the rate of the eddy current loss to the output is plotted on the axis of ordinate is shown in FIG. 10. It is understood that the correlation is shown between the rate of the eddy current loss to the output and the parameter X.

Next, let us consider in what manner X should be selected when an eddy current loss of a rotor is reduced and a high efficiency generator or motor is designed. If the efficiency of a generator or motor is intended to be designed so as to meet equal to or higher than 95%, then the total of a copper loss, a core loss and a mechanical loss caused in a stator, and a stray load loss containing an eddy current loss of a rotor needs to be designed so as to meet equal to or smaller than 5%. Since the mechanical loss is generally smaller than the copper loss and the core loss, it does not need to be taken into consideration so much. Though the copper loss and the core loss can be reduced on the basis of a size, a shape and the like of the stator to some degree, there is a limit thereto. Then, it is considered that if a construction is adopted in which the eddy current loss of the rotor can be reduced down to a half of the total loss 5%, i.e., 2.5%, then the total loss of summing up the losses such as the copper loss and the core loss can be suppressed to about 5%. In other words, it is considered that if the eddy current loss of the rotor can be suppressed to about 2.5% of the rated output, then the high efficiency of 95% can be attained. Then, it is conceivable that since for attaining equal to or smaller than 2.5% as the rate of the eddy current loss in the graph shown in FIG. 10, the value X needs to be suppressed to equal to or smaller than 0.6 [m], if the following Expression (19) is obtained, then it is possible to realize a high efficiency permanent magnet type generator or motor. For the generator of FIG. 1, as a result of analysis of the magnetic field, it was found that the eddy current loss of the rotor is no more than 0.6% of the rated output. Since X is 0.17 [m] in this generator, of course, this condition meets Expression (19).

$$(N+P)^{1.5}N^{-4}P^2D<0.6 \quad (19)$$

From the foregoing, such a construction as to meet Expression (19) is adopted, whereby even if a permanent magnet type dynamo electric machine is large-sized, the spatial harmonic order N of a specific armature magnetomotive force to be the cause of the eddy current of a rotor can be made large to allow the eddy current generated in the rotor to be reduced. As a result, such an effect can be obtained that the calorification of the rotor can be suppressed, and at the same time, such an effect can also be obtained that the high efficiency promotion of the dynamo electric machine can be realized. Furthermore, in this embodiment mode, such an effect can be obtained that the eddy current loss of the rotor can be reduced through the use of the massive rotor yoke, without adopting such a complicated and expensive construction as described in the prior art, where a yoke of a rotor is partitioned or insulatedly divided. In addition, in this embodiment mode, the description has been given with respect to the surface magnet type dynamo electric machine including magnets on the surface of the rotor. However, a buried magnet type dynamo electric machine as well having magnets buried in a rotor iron core is the same in the sense that the asynchronous components of the armature magnetomotive force become the cause of the eddy current loss of the magnets or the like. Therefore, it is needless to mention that with respect to the buried magnet type dynamo electric machine as well, the construction of this embodiment mode is adopted to thereby obtain the same effects.

In addition, while in this embodiment mode the inner rotor type dynamo electric machine has been described, it is needless to mention that even in the case of an outer rotor type dynamo electric machine in which a rotor is rotated along the outside of a stator, the same effects are obtained. Moreover, it is needless to mention that not only in the radial gap type described in this embodiment mode, but also in an axial gap type in which a stator confronts with a rotor with respect to a surface perpendicular to a rotational axis, if a distance from the rotational axis to rotor magnetic poles is defined as a radius of the rotor, and a value which is double that radius is defined as a diameter D, the same effects are obtained.

Embodiment 2

Figure 11:
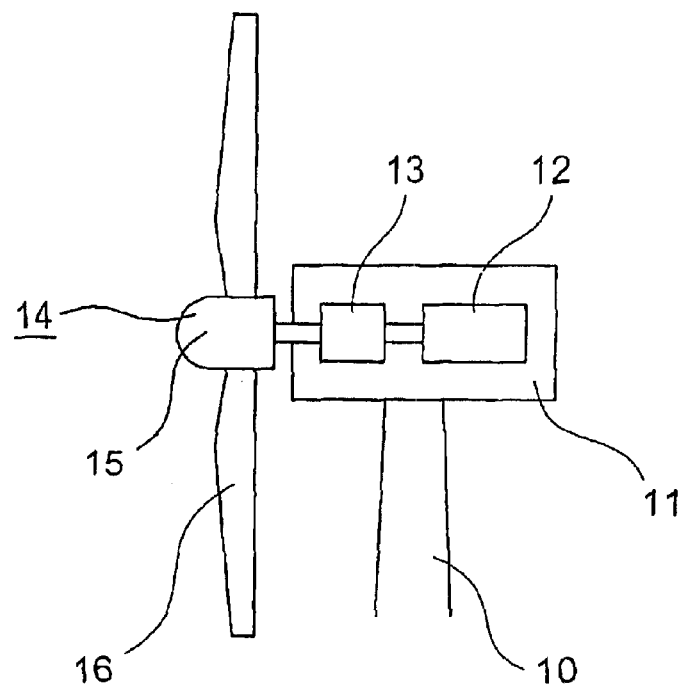
FIG. 11 is a view showing a construction of a wind power generation system according to an embodiment mode 2 of the present invention.
Figure 12:
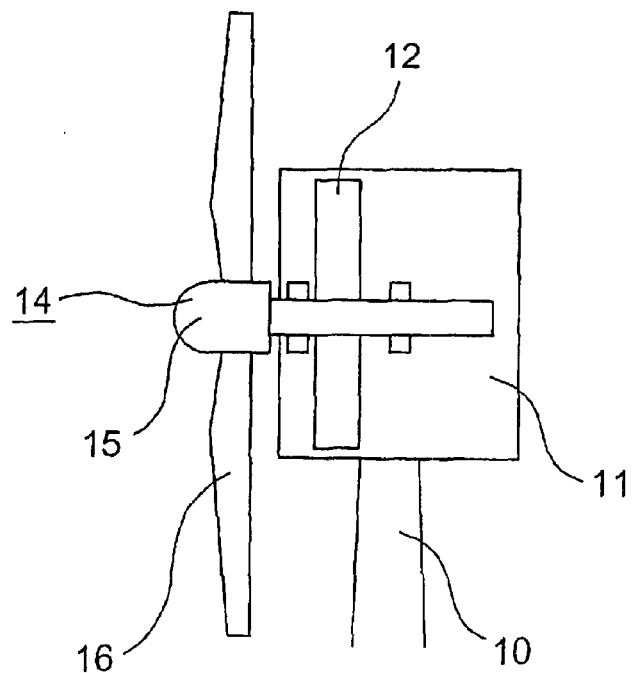
FIG. 12 is a view showing a construction of another example of a wind power generation system according to the embodiment mode 2 of the present invention.

In this embodiment mode, similarly to the permanent magnet type dynamo electric machine shown in the embodiment mode 1, the description will hereinbelow be given with respect to an example in which such a construction as to meet Expression (19) shown in the above-mentioned embodiment 1 is applied to a permanent magnet type synchronous generator for wind power generation including a rotor having a plurality of magnetic poles composed of permanent magnets, and a stator having armature windings wound around the magnetic poles. Schematic diagrams of a wind power generation system are shown in FIG. 11 and FIG. 12. In these figures, reference numeral 10 designates a tower as a pole brace of the wind power generation system, and reference numeral 11 designates a nacelle provided on the tower 10. In the inside of the nacelle 11, in an example of FIG. 11, a generator 12 and an accelerating gear 13 are provided, while in an example of FIG. 12, only the generator 12 is provided. Reference numeral 14 designates a wind mill provided in a head of the nacelle 11, and reference numerals 15 and 16 designate a hub and a blade constituting the wind mill 14, respectively. Note that, the rotor and stator are the same in construction as those of FIG. 1 shown in the above-mentioned embodiment 1, the description thereof is omitted here.

As described above, in the example of FIG. 11, the nacelle 11 is provided on the tower 10, the generator 12 and the accelerating gear 13 are accommodated in the inside of the nacelle 11, and the wind mill 14 is connected to the head of the nacelle 11. The wind mill 14 constituted by the hub 15 and the blade 16, and the generator 12 are connected to each other through the accelerating gear 13. In this system, since the accelerating gear 13 is provided therebetween, whereby the rotational frequency of the generator 12 is made higher than that of the windmill 14, there is an advantage in that a torque of the generator 12 may be small, and hence the miniaturization of the generator 12 becomes possible. However, there are problems in noises generated by the accelerating gear 13, maintenance of the accelerating gear 13, and the like. On the other hand, in recent years, as shown in FIG. 12, a so-called gearless type wind power generation system in which the wind mill 14 and the generator 12 are directly connected to each other is becoming widespread. In the gearless type wind power generation system concerned, moreover, the permanent magnet type synchronous generator is advantageous in a respect that there is no field system loss, as compared with the winding field system type synchronous generator.

While in this system, there is no problem with respect to noises due to the accelerating gear, and maintenance, since a torque of the generator becomes larger than that of the gearless type, the physique of the generator itself becomes large. As has been described so far, in accordance with Expression (18), the eddy current loss of the rotor is further increased as the rotor outer diameter D of the generator is increased. Accordingly, if the selection of the number P of poles and the number S of slots is not suitably carried out, then the eddy current loss is increased and hence it is unable to make the best use of the advantage of the permanent magnet type synchronous generator in which there is no field system loss.

Therefore, in the permanent magnet type synchronous generator for wind power generation, in particular, in the permanent magnet type synchronous generator having a large rotor diameter that is incorporated in the gearless type wind power generation system, such a construction as to meet Expression (19) is adopted, whereby the eddy current loss of the rotor can be reduced to allow the calorification of the rotor to be suppressed, and at the same time, a high efficiency promotion of the generator can be realized. As a result, such an effect can be obtained that the energy of nature called a wind force can be effectively utilized.

Embodiment 3

Figure 13:
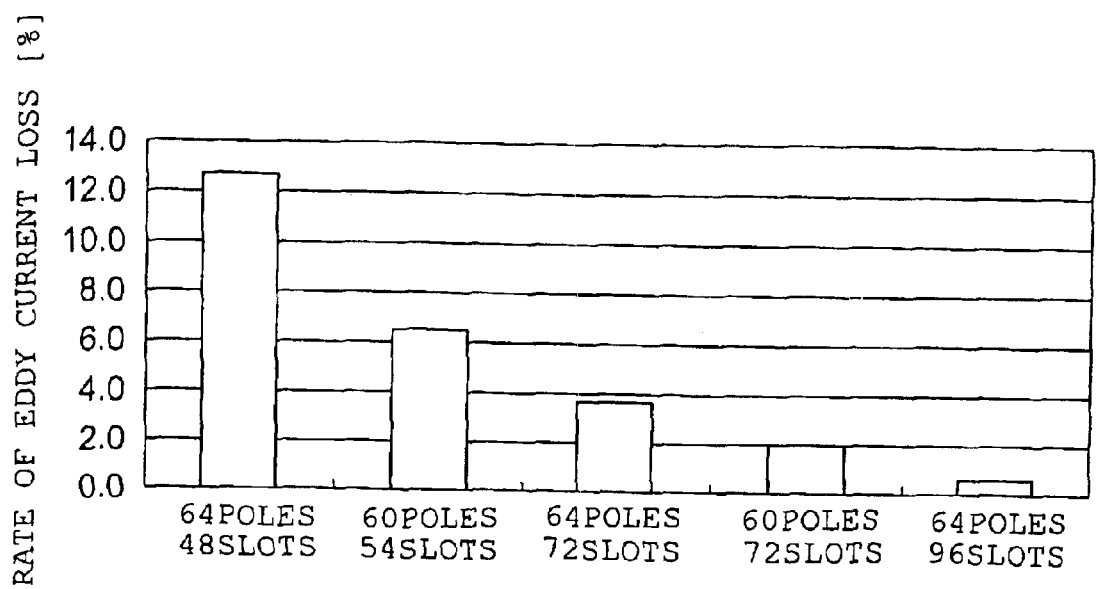
FIG. 13 is a graph showing a relationship of a ratio of an eddy current loss v.s. combinations of the number of poles and the number of slots in a permanent magnet type generator according to an embodiment mode 3 of the present invention.
Figure 14:
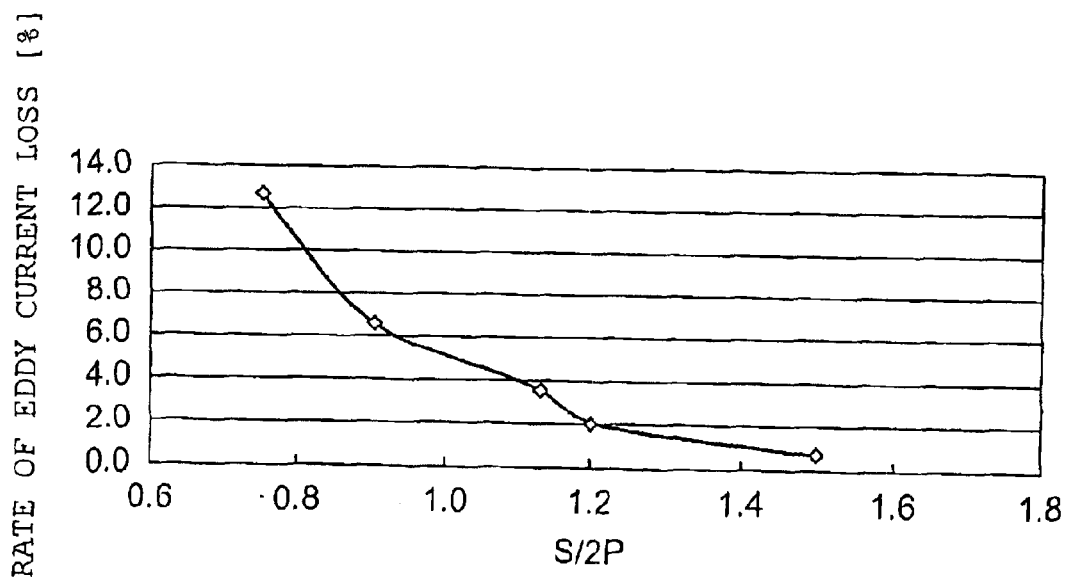
FIG. 14 is a graph showing a relationship of a ratio of an eddy current loss v.s. (the number of slots/the number of poles) in the permanent magnet type generator according to the embodiment mode 3 of the present invention.

As has been described so far, in the large permanent magnet type generator or motor in which the rotor is of the concentrated wiring, if the number P of pole pairs and the spatial harmonic order N of the magnetomotive force to be the cause of an eddy current are not suitably selected, then an eddy current loss of the rotor may be remarkably increased in some cases. In other words, if the number P of pole pairs and the number S of slots are not suitably selected, then there is a fear of calorification due to the eddy current, and reduction of the efficiency. On the other hand, various combinations are considered for the number 2P of poles and the number S of slots of the dynamo electric machine with the concentrated winding. As the combination which is often used, there are the combinations of 2P:S=4:3, 10:9, 8:9, 10:12, 2:3 and the like. Here, designs are considered of permanent magnet type synchronous generators having the same output and each having a rotor outer diameter of 3 m under the condition of 64 poles and 48 slots, 60 poles and 54 slots, 64 poles and 72 slots, 60 poles and 72 slots, and 64 poles 96 slots so as for the number of poles to become about 60 with respect to these five kinds of combinations. Note that, for the purpose of setting the same condition in order to make a comparison among the eddy current losses caused in the rotors, respectively, the rotational frequencies are made identical to one another. In addition, the widths of slot opening portions were designed substantially equal to one another in order to prevent an influence of a change in permeance of a slot opening portion from being increased. Then, with respect to these five kinds of generators, eddy current losses caused in the rotors during the rated running were found on the basis of the analysis of the electromagnetic field. The rates of the respective eddy current losses to the outputs are shown in FIG. 13. From these results, it is understood that even if the numbers 2P of poles are designed substantially equal to one another, there is a large difference in eddy current loss depending on the combination of the number of poles and the number of slots. Moreover, a graph in which the ratio S/2P of the number of slots to the number of poles is plotted on the axis of abscissa is shown in FIG. 14. From these results, it is understood that when S/2P>1, i.e., 2P<S, the eddy current is small, conversely when S/2P<1, i.e., 2P>S, the eddy current loss is large.

Let us consider the cause thereof. When paying attention to the spatial harmonic order N of the asynchronous components of the magnetomotive force to be the main cause of the eddy current with reference to FIG. 3 and FIGS. 5 to 8, in the combinations of 2P S=4:3, and 10:9, i.e., 2P>S, the asynchronous magnetomotive force components each having amplitude equal to or larger than that of the synchronous component are present in the region having the asynchronous components each having a order lower than that of the synchronous component. More specifically, when 2P:S=4:3, the magnetomotive force of −1/2-th order the amplitude of which is 2 times as large as that of the synchronous component is present, and when 2P:S=10:9, the magnetomotive force of −4/5-th order the amplitude of which is 1.25 times as large as that of the synchronous component is present. However, in the combinations of 2P:S=8:9, 10:12, and 2:3, i.e., 2P<S, any of the asynchronous magnetomotive force components each having large amplitude is absent in the region having the asynchronous components each having a order lower than that of the synchronous component. In this case, since the number of pole pairs is 30 or 32, i.e., is substantially fixed, and the rotor outer diameter D is also fixed, the magnitude of the eddy current loss of the rotor depends on the spatial harmonic order N of the magnetomotive force from Expression (18). Accordingly, when a large permanent magnet type dynamo electric machine with concentrated winding is designed, it may safely be said that since when a relationship of 2P<S is adopted, N can be designed so as to be smaller, the eddy current loss becomes less. Of course, even in the case of the condition of 2P>S, if the number of poles is increased to obtain such a construction as to meet Expression (19), then the eddy current loss can be reduced. However, since if the values of the parameter X are intended to be designed so as to be identical to one another, then the number of poles is increased to increase the processing cost, which is disadvantageous as compared with the case where the condition of 2P<S is adopted.

From the foregoing, in the large permanent magnet type dynamo electric machine, such a construction as to meet the condition of 2P<S is adopted, whereby such an effect can be obtained that the eddy current loss of the rotor can be reduced to allow the calorification of the rotor to be suppressed, and at the same time, the high efficiency promotion of the generator is realized. Moreover, in the case where a construction of reducing the eddy current loss is adopted, such an effect can be obtained that it is possible to provide the permanent magnet type dynamo electric machine which is less in processing cost and is lower in cost since the number of poles is decreased as compared with the case where the condition of 2P<S is adopted.

In particular, in the case where the dynamo electric machines with the concentrated winding are designed with the numbers of poles being identical to or substantially identical to one another, since when 2P:S=2:3, N takes the largest value as compared with other cases, the construction can be made with the least number of poles, which is very advantageous. Since it is understood from FIG. 3 that since when 2P:S=2:3, the main cause of the eddy current is the opposite-phase magnetomotive force of 2-nd order, in the case of 2P poles, a relationship of N=2P is obtained. When this relationship is substituted for Expression (19), the following Expression (20) is obtained:

$$P^{-0.5}D<1.85 \qquad (20).$$

Thus, such a construction as to meet Expression (20) is adopted in the permanent magnet type dynamo electric machine with the concentrated winding in which a combination of the number P of pole pairs and the number S of slots has the ratio of 2P:S=2:3, whereby an increase in spatial harmonic order N of a specific higher harmonic component of the armature magnetomotive force to be the cause of the eddy current can be especially realized with a small number of poles. Accordingly, such an effect can be obtained that the eddy current loss of the rotor can be reduced, and also such an effect can be obtained that the processing cost required for the magnetic poles can be especially reduced.

On the other hand, a judgement is made similarly with respect to the case as well where relationships of 2P:S=8:9 and 10:12 are established even in the permanent magnet type dynamo electric machine of the concentrated wiring meeting the condition of 2P<S. When the relationship of 2P:S=8:9 is established, from FIG. 7, the opposite-phase magnetomotive force of 5/4-th order is the main cause of the eddy current. Then, N=5P/4 is substituted for Expression (19) to obtain the following Expression (21):

$$P^{-0.5}D<0.43 \qquad (21).$$

Accordingly, when 2P:S=8:9, such a construction as to meet Expression (21) is adopted, whereby such an effect can be obtained that it is possible to provide a high efficiency permanent magnet type dynamo electric machine in which the eddy current caused to flow through the rotor is reduced to allow the calorification of the rotor to be suppressed. In addition, when 2P:S=10:12, from FIG. 8, the opposite-phase magnetomotive force of 7/5-th order becomes a main cause of the eddy current. Then, N=7P/5 is substituted for Expression (19) to obtain the following Expression (22):

$$P^{-0.5}D<0.62 \qquad (22).$$

Accordingly, when 2P:S=10:12, such a construction as to meet Expression (22) is adopted, whereby such an effect can be obtained that it is possible to provide the high efficiency permanent magnet type dynamo electric machine in which the eddy current caused to flow through the rotor is reduced to allow the calorification of the rotor to be suppressed.

In addition, in the permanent magnet type dynamo electric machines with the concentrated winding having the combinations of 2P:S=8:9 and 2P:S=10:12, winding factors are 0.945 and 0.933, respectively, each of which is larger than 0.866 in the case of the combinations of 2P:S=4:3 and 2:3. Therefore, such an effect can be obtained that it is possible to provide a dynamo electric machine in which a quantity of use of the magnets can be reduced and which is low in cost. In addition, in the case where the dynamo electric machines are designed with the numbers of poles being identical to or substantially identical to one another, a least common multiple between the number of poles and the number of slots in this case becomes larger than that of each of the cases of 2P:S=4:3 and 2:3. For example, in the cases of 64 poles and 48 slots (2P:S=4:3) and 64 poles and 96 slots (2P:S=2:3), both the least common multiples are 192, whereas in the case of 64 poles and 72 slots (2P:S=8:9), the least common multiple is 576, and in the case of 60 poles and 72 slots (2P:S=10:12), the least common multiple is 360. In general, a cogging torque is small as a least common multiple is larger. Accordingly, the combinations of 2P:S=8:9 and 10:12 are adopted, whereby it is possible to obtain the permanent magnet type dynamo electric machine having a small cogging torque. In particular, in the permanent magnet type synchronous generator for wind power generation, if a cogging torque is large, a wind velocity required to activate a wind mill is increased, which is disadvantageous. Accordingly, the combinations of 2P:S=8:9 and 10:12 are adopted, whereby a cogging torque becomes small, and as a result, such an effect can be obtained that even if a wind velocity is low, a wind mill is activated to allow a power generation to be started.

From foregoing, such a construction as to meet Expression (21) or (22) is adopted in the permanent magnet type dynamo electric machine with the concentrated winding in which a combination of the number P of pole pairs and the number S of slots has the ratio of 2P:S=8:9 or 10:12, respectively, whereby an increase in spatial harmonic order N of a specific higher harmonic component of the armature magnetomotive force to be the cause of the eddy current can be realized with the smaller number of poles as compared with the case where the condition of 2P>S is adopted. Thus, such an effect can be obtained that the eddy current loss of the rotor can be reduced, and also such an effect can be obtained that the processing cost required for the magnetic poles can be especially reduced. Moreover, such an effect can be obtained that it is possible to provide the dynamo electric machine, which is low in cost since the winding factor, is high to allow a quantity of use of the magnets to be reduced. In addition, such an effect can also be obtained that since a least common multiple between the number of poles and the number of slots is large, a small cogging torque is obtained and hence even if a wind velocity is low, a wind mill is activated to start the power generation.

Embodiment 4

Figure 15:
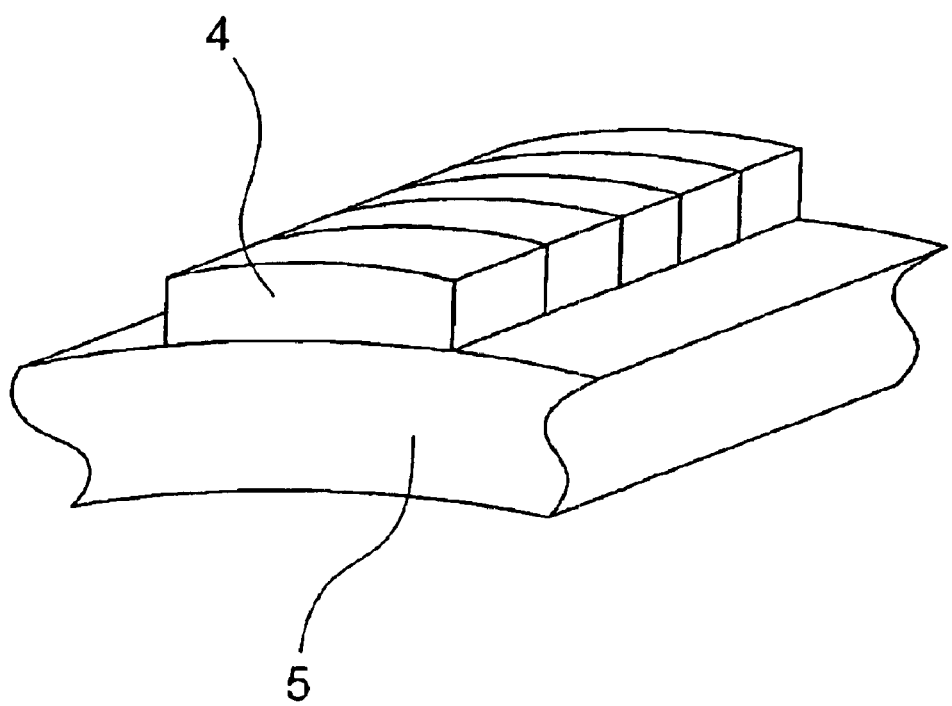
FIG. 15 is a partial perspective view showing a construction of a permanent magnet type synchronous generator according to an embodiment mode 4 of the present invention.

This embodiment mode is shown in FIG. 15. In this embodiment mode, a construction is adopted as shown in FIG. 15 in which, a permanent magnet 4 is fixed to a surface of a yoke 5 of a rotor, and also the permanent magnet 4 is divided in an axial direction of the rotor. The individual permanent magnets 4 obtained through the division are electrically insulated from one another. Since other constructions are the same as those of the above-mentioned embodiment mode 1, the description thereof is omitted here.

In recent years, rare earth series magnets have been often used. However, since the rare earth magnet has high electric conductivity, an eddy current may become a problem in some cases. Then, as has been described so far, the number P of pole pairs, the spatial harmonic order N of the magnetomotive force and the outer diameter D of the rotor are combined so as to meet Expression (19), and further, such a construction is adopted that the permanent magnet 4 is divided as shown in FIG. 15, whereby the eddy current loss in the whole rotor can be reduced, and in addition, the eddy current loss caused in the magnet itself can be largely reduced to allow the calorification of the permanent magnet 4 to be suppressed. As a result, such an effect can be obtained that it is possible to obtain the high efficiency permanent magnet type dynamo electric machine.

The effects of the present invention will hereinafter be described.

According to the present invention, there is provided a permanent magnet dynamo electric machine having a rotor having a plurality of magnetic poles including permanent magnets, and a stator having armature windings concentratedly wound around teeth, in which when the number of pole pairs of the magnetic poles of the rotor is P, diameter of the rotor is D [m], spatial harmonic order of a predetermined higher harmonic component of an armature magnetomotive force of the stator is N (a mechanical angle 360 degrees is determined as 1-st order), and an output of the permanent magnet dynamo electric machine is $P_{out}$,+1.2, a parameter X (its unit is m) used to evaluate the rate of an eddy current loss caused in the rotor is defined as follows;

$$X = (N+P)^{1.5} N^{-4} P^2 D$$

and values of the P, D and N are selected so that a value of the X becomes smaller than a predetermined value. Thus, such a construction is adopted, whereby, even if the permanent magnet dynamo electric machine is made large, it is possible to increase the specific spatial harmonic order N of the armature magnetomotive force to be the cause of the eddy current of the rotor and hence it is possible to reduce the eddy current generated in the rotor. As a result, the calorification of the rotor can be suppressed, and at the same time, such an effect can also be obtained that the high efficiency promotion of the dynamo electric machine can be realized. Moreover, even if such a complicated and expensive construction as described in the prior art is not adopted, where the yoke of the rotor is partitioned or insulatedly divided, the eddy current loss of the rotor can be reduced while keeping a construction having an integral one-piece yoke.

Further, according to the present invention, there is provided a permanent magnet dynamo electric machine having a rotor having a plurality of magnetic poles including permanent magnets, and a stator having armature windings concentratedly wound around teeth, in which when the number of pole pairs of the rotor is P, diameter of the rotor is D[m], a spatial harmonic order of a predetermined higher harmonic component of an armature magnetomotive force of the stator is N (a mechanical angle 360 degrees is determined as 1-st order), and an output of the permanent magnet dynamoelectric machine is $P_{out}$, and then the D is made equal to or larger than $0.00045 P_{out}+1.2$, and P, D and N meet the following relationship:

$$(N+P)^{1.5} N^{-4} P^2 D < 0.6$$

(its unit is m).

Thus, such a construction is adopted, whereby even if the permanent magnet dynamo electric machine is made large, it is possible to increase the specific spatial harmonic order N of the armature magnetomotive force to be the cause of the eddy current of the rotor and hence it is possible to reduce the eddy current generated in the rotor. As a result, the calorification of the rotor can be suppressed, and at the same time, such an effect can also be obtained that the high efficiency promotion of the dynamo electric machine can be realized. Moreover, even if such a complicated and expensive construction as described in the prior art is not adopted, where the yoke of the rotor is partitioned or insulatedly divided, such the eddy current loss of the rotor can be reduced while keeping a construction having an integral one-piece yoke.

Further, when the number of slots of the stator is S, the P and the S meet a relationship of 2P<S. With such a construction, an increase in spatial harmonic order N of the specific higher harmonic component of the armature magnetomotive force to be the cause of the eddy current can be realized with a small number of poles as compared with a permanent magnet type dynamo electric machine in which 2P>S. Thus, such an effect can be obtained that the eddy current loss of the rotor can be reduced, and also such an effect can be obtained that the processing cost required for the magnetic poles can be reduced.

Further, when the number of slots of the stator is S, the P and the S meet a relationship of 2P:S=2:3, and also the P and the D meet the following relationship:

$$P^{-0.5} D < 1.85$$

(its unit is m).

With such a construction, an increase in spatial harmonic order N of the specific higher harmonic component of the armature magnetomotive force to be the cause of the eddy current can be realized with a particularly small number of poles. Thus, such an effect can be obtained that the eddy current loss of the rotor can be reduced, and also such an effect can be obtained that the processing cost required for the magnetic poles can be particularly reduced.

In addition, when the number of slots of the stator is S, such a construction is adopted that the P and the S meet a relationship of 2P:S=8:9, and also the P and the D meet the following relationship:

$$P^{-0.5}D<0.43$$

(its unit is m).

With such a construction, an increase in spatial harmonic order N of the specific higher harmonic component of the armature magnetomotive force to be the cause of the eddy current can be realized with a small number of poles. Thus, such an effect can be obtained that the eddy current loss of the rotor can be reduced, and also such an effect can be obtained that the processing cost required for the magnetic poles can be reduced. Moreover, since a least common multiple between the number of poles and the number of slots is large, such an effect can be obtained that a cogging torque can be reduced. Also, since a winding factor is high to allow a quantity of use of the magnets to be reduced, such an effect can be obtained that the low cost promotion can be realized.

Further, when the number of slots of the stator is S, the P and the S meet a relationship of 2P:S=10:12, and also the P and the D meet the following relationship:

$$P^{-0.5}D<0.62$$

(its unit is m).

With such a construction, an increase in spatial harmonic order N of the specific higher harmonic component of the armature magnetomotive force to be the cause of the eddy current can be realized with a small number of poles. Thus, such an effect can be obtained that the eddy current loss of the rotor can be reduced, and also such an effect can be obtained that the eddy current loss of the rotor can be reduced. Moreover, since a least common multiple between the number of poles and the number of slots is large, such an effect can be obtained that a cogging torque can be reduced. Also, since a winding factor is high to allow a quantity of use of the magnets to be reduced, such an effect can be obtained that the low cost promotion can be realized.

In addition, the above-mentioned permanent magnet constituting the magnetic poles of the rotor is axially divided to provide a partition construction, whereby it is possible to reduce the eddy current loss caused in the magnets. As a result, such an effect can be obtained that the calorification of the magnets can be suppressed, and hence it is possible to obtain the high efficiency permanent magnet type dynamo electric machine.

Moreover, according to the present invention, there is provided a permanent magnet synchronous generator for wind power generation having a rotor having a plurality of magnetic poles including permanent magnets, and a stator having armature windings concentratedly wound around teeth, in which when the number of pole pairs of the magnetic poles of the rotor is P, diameter of the rotor is D[m], a spatial harmonic order of a predetermined higher harmonic component of an armature magnetomotive force of the stator is N (a mechanical angle 360 degrees is determined as 1-st order), and an output of the permanent magnet dynamo electric machine is $P_{out}$, and D is made equal to or larger than $0.00045P_{out}+1.2$, a parameter X (its unit is m) used to evaluate the value of an eddy current loss caused in the rotor is defined as follows;

$$X=(N+P)^{1.5}N^{-4}P^{2}D$$

And values of the P, D and N are selected so that a value of the X becomes smaller than a predetermined value. Thus, with such a construction, even in a large permanent magnet synchronous generator having such a rotor diameter as to exceed 1 m which is incorporated in a permanent magnet synchronous generator for wind power generation, in particular, in a gearless type wind power generation system, eddy current loss caused in the rotor can be suppressed, and at the same time, the high efficiency promotion of the generator can be realized. Furthermore, even if such a complicated and expensive construction as described in the prior art is not adopted, where a yoke of a rotor is partitioned or is insulatedly divided, an eddy current loss of the rotor can be reduced while keeping a construction of an integral one-piece yoke.

Further, according to the present invention, there is provided a permanent magnet synchronous generator for wind power generation having a plurality of magnetic poles including permanent magnets, and a stator having armature windings concentratedly wound around teeth, in which when the number of pole pairs of the rotor is P, diameter of the rotor is D[m], a spatial harmonic order of a predetermined higher harmonic component of an armature magnetomotive force of the stator is N (a mechanical angle 360 degrees is determined as 1-st order), and an output of the permanent magnet dynamo electric machine is $P_{out}$, the D is made equal to or larger than $0.00045P^{out}+1.2$, and P, D and N meet the following relationship:

$$(N+P)^{1.5}N^{-4}P^{2}D<0.6$$

(its unit is m).

Thus, with such a construction, even in a large permanent magnet synchronous generator having such a rotor diameter as to exceed 1 m which is incorporated in a permanent magnet synchronous generator for wind power generation, in particular, in a gearless wind power generation system, eddy current loss caused in the rotor can be reduced, as a result, the calorification of the rotor can be suppressed, and at the same time, the high efficiency promotion of the generator can be realized. Furthermore, even if such a complicated and expensive construction as described in the prior art is not adopted, where a yoke of a rotor is partitioned or is insulatedly divided, eddy current loss of the rotor can be reduced while keeping a construction of an integral one-piece yoke.

INDUSTRIAL APPLICABILITY

As described above, the permanent magnet type dynamo electric machine of the present invention is useful when being used in the various types of power generation such as wind power generation.

What is claimed is:
1. A permanent magnet dynamo electric machine comprising:
 a rotor with a plurality of magnetic poles including permanent magnets; and
 a stator with armature windings concentratedly wound around teeth, wherein, when number of pole pairs of the rotor is P, diameter of the rotor is D (in meters), spatial harmonic order of a predetermined harmonic component of an armature magnetomotive force of the stator is N (a mechanical angle 360 degrees is a 1-st order), and output of the permanent magnet dynamo electric machine is $P_{out}$, and D is at least $0.00045P_{out}+1.2$, a parameter X (in meters) used to evaluate rate of eddy current loss in the rotor is

$$X=(N+P)^{1.5}N^{-4}P^{2}D,$$

and P, D, and N are selected so that X is smaller than a predetermined value.

2. The permanent magnet dynamo electric machine according to claim 1, wherein X<0.6 (in meters).

3. The permanent magnet dynamo electric machine according to claim 1, wherein, when number of slots of the stator is S, 2P<S.

4. The permanent magnet dynamo electric machine according to claim 1, wherein, when number of slots fo the stator is S, 2P:S=2:3, and $P^{-0.5}D<1.85$ (in meters).

5. The permanent magnet dynamo electric machine according to claim 1, wherein, when the number of slots of the stator is S, 2P:S=8:9, and $P^{-0.5}D<0.43$ (in meters).

6. The permanent magnet dynamo electric machine according to claim 1, wherein, when number of slots of the stator is S, 2P:S=10:12, and $P^{-0.5}D<0.62$ (in meters).

7. The permanent magnet dynamo electric machine according to claim 1, wherein the permanent magnets of the magnetic poles of the rotor are axially divided in a partition construction.

8. A permanent magnet synchronous generator for wind power generation comprising:

a rotor with a plurality of magnetic poles including permanent magnets; and a stator with armature windings concentratedly wound around teeth, wherein, when number of pole pairs of the rotor is P, diameter of the rotor is D (in meters), spatial harmonic order of a predetermined harmonic component of an armature magnetomotive force of the stator is N (a mechanical angle 360 degrees is a 1-st order), output of the permanent magnet dynamo electric machine is $P_{out}$, and D is at least $0.0045P_{out}+1.2$, a parameter X (in meters) used to evaluate rate of eddy current loss in the rotor is $$X=(N+P)^{1.5}N^{-4}P^2D,$$

and P, D, and N are selected so that X is smaller than a predetermined value.

9. The permanent magnet synchronous generator for wind power generation according to claim 8, wherein x<0.6 (in meters).

10. A permanent magnet dynamo electric machine comprising:

a rotor with a plurality of magnetic poles including permanent magnets; and a stator with armature windings concentratedly wound around teeth, wherein, when number of pole pairs of the rotor is P, diameter of the rotor is D (in meters), spatial harmonic order of a predetermined harmonic component of an armature magnetomotive force of the stator is N (a mechanical angle 360 degrees is a 1-st order), output of the permanent magnet dynamo electric machine is $P_{out}$, and D is at least $0.0045P_{out}+1.2$, a parameter X (in meters) used to evaluate rate of eddy current loss in the rotor is $$X=(N+P)^{1.5}N^{-4}P^2D,$$

and P, D, and N are selected so that X is smaller than a predetermined value.

11. The permanent magnet dynamo electric machine according to claim 10, wherein X<0.6 (in meters).

12. The permanent magnet dynamo electric machine according to claim 10, wherein, when number of slots of the stator is S, 2P<S.

13. The permanent magnet dynamo electric machine according to claim 10, wherein, when the number of slots of the stator is S, 2P:S=2:3, and $P^{-0.5}D<1.85$ (in meters).

14. The permanent magnet dynamo electric machine according to claim 10, wherein, when number of slots of the stator is S, 2P:S=8:9, and $P^{-0.5}D<0.43$, (in meters).

15. The permanent magnet dynamo electric machine according to claim 10, wherein, when the number of slots of the stator is S, 2P:S=10:12, and $P^{-0.5}D<0.62$ (in meters).

16. The permanent magnet dynamo electric machine according to claim 10, wherein the permanent magnets of the magnetic poles of the rotor are axially divided in a partition construction.

* * * * *